US009591431B2

(12) United States Patent
Cho et al.

(10) Patent No.: US 9,591,431 B2
(45) Date of Patent: Mar. 7, 2017

(54) SHORT-RANGE WIRELESS COMMUNICATION NODE DEVICE AND METHOD FOR ALARMING ON THE NODE DEVICE ASSEMBLING STATE

(71) Applicant: SAMSUNG SDS CO., LTD., Seoul (KR)

(72) Inventors: Seong Hwan Cho, Seoul (KR); Kwang Hyun Lee, Seoul (KR); Taek Sun Shin, Seoul (KR); Kyu Yull Lee, Seoul (KR); Eun Ju Yoo, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 0 days.

(21) Appl. No.: 14/582,579

(22) Filed: Dec. 24, 2014

(65) Prior Publication Data

US 2016/0066125 A1 Mar. 3, 2016

(30) Foreign Application Priority Data

Aug. 26, 2014 (KR) ........................ 10-2014-0111224

(51) Int. Cl.
*H04B 7/00* (2006.01)
*H04W 4/00* (2009.01)
*H04W 24/02* (2009.01)

(52) U.S. Cl.
CPC ........... *H04W 4/008* (2013.01); *H04W 4/005* (2013.01); *H04W 24/02* (2013.01)

(58) Field of Classification Search
CPC ...... H04W 4/008; H04W 4/005; H04W 24/02
(Continued)

(56) References Cited

U.S. PATENT DOCUMENTS

2006/0199534 A1* 9/2006 Smith .................. G08B 21/023
455/41.2
2008/0056261 A1* 3/2008 Osborn ............... H04L 12/2834
370/392

(Continued)

FOREIGN PATENT DOCUMENTS

| KR | 10-1107008 B1 | 1/2012 |
| KR | 10-2013-0023186 A | 3/2013 |
| WO | 2014/003510 A1 | 1/2014 |

OTHER PUBLICATIONS

Becker et al; "Logistic application with Wireless Sensor Networks"; In: Proc of HotEmNets; 2010; 5 pgs.

(Continued)

*Primary Examiner* — Ayodeji Ayotunde
(74) *Attorney, Agent, or Firm* — Sughrue Mion, PLLC

(57) ABSTRACT

A wireless communication node device is provided. The node device includes a network adaptor configured to perform short-range wireless communication, a channel manager configured to receive channel setting information comprising information about channel member nodes through the network adaptor, and to store the received channel setting information, a channel state manager configured to update a channel state table which indicates that the node device is connected to another node device, in response to the node device being connected to the other node device through the network adaptor, and to propagate the updated connection state table via the network adaptor, and an alarm controller configured to verify a connection state between the channel member nodes by analyzing the connection state table, and to generate an alarm control signal based on the verified connection state.

19 Claims, 12 Drawing Sheets

(58) Field of Classification Search
USPC .................................................. 455/41.2, 561
See application file for complete search history.

(56) References Cited

U.S. PATENT DOCUMENTS

2011/0245932 A1* 10/2011 Schleiss ................ H04W 48/08
                                                                          700/7
2012/0309312 A1   12/2012 Sim et al.
2013/0294285 A1   11/2013 Zhang et al.

OTHER PUBLICATIONS

International Search Report for PCT/KR2014/012884 dated May 22, 2105 [PCT/ISA/210].

* cited by examiner (a)  (b)

FIG. 9
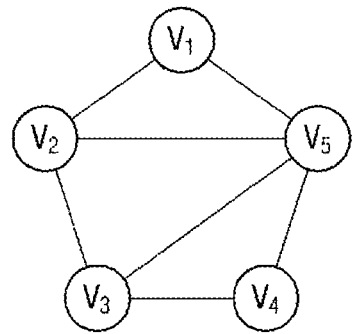
(a)
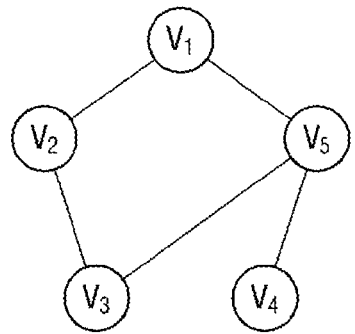
(b)
FIG. 10
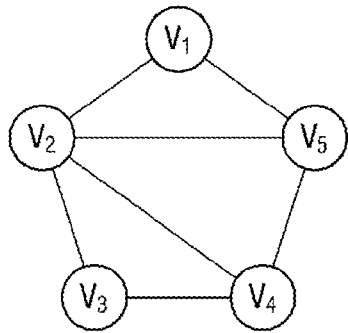
(a)
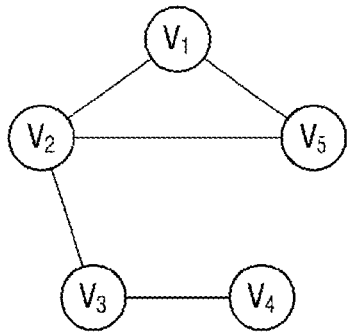
(b)
min DEGREE=2
FIG. 11
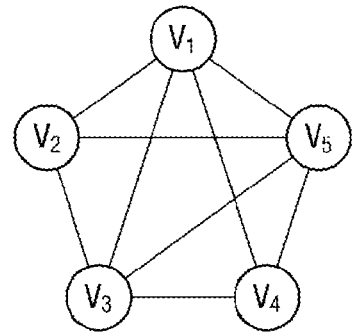

|     | 1-1 | 1-2 | 1-3 | 1-4 | 1-5 | 2-1 | 2-2 | 2-3 | 2-4 | 2-5 |
| --- | --- | --- | --- | --- | --- | --- | --- | --- | --- | --- |
| 1-1 |     |     |     |     |     |     |     |     |     |     |
| 1-2 |     |     |     |     |     |     |     |     |     |     |
| 1-3 |     |     |     |     |     |     |     |     |     |     |
| 1-4 |     |     |     |     |     |     |     |     |     |     |
| 1-5 |     |     |     |     |     |     |     |     |     |     |
| 2-1 |     |     |     |     |     |     |     |     |     |     |
| 2-2 |     |     |     |     |     |     |     |     |     |     |
| 2-3 |     |     |     |     |     |     |     |     |     |     |
| 2-4 |     |     |     |     |     |     |     |     |     |     |
| 2-5 |     |     |     |     |     |     |     |     |     |     |

FIG. 16

|  | 1-1 | 1-2 | 1-3 | 1-4 | 1-5 | 2-1 | 2-2 | 2-3 | 2-4 | 2-5 |
|---|---|---|---|---|---|---|---|---|---|---|
| 1-1 |  | ▨ |  | ▨ |  |  |  |  |  |  |
| 1-2 | ▨ |  | ▨ |  |  |  |  |  |  |  |
| 1-3 |  | ▨ |  |  | ▨ |  |  |  |  |  |
| 1-4 | ▨ |  |  |  | ▨ |  |  |  |  |  |
| 1-5 |  |  | ▨ | ▨ |  |  |  |  |  |  |
| 2-1 |  |  |  |  |  |  |  |  |  |  |
| 2-2 |  |  |  |  |  |  |  |  |  |  |
| 2-3 |  |  |  |  |  |  |  |  |  |  |
| 2-4 |  |  |  |  |  |  |  |  |  |  |
| 2-5 |  |  |  |  |  |  |  |  |  |  |

FIG. 17

|  | 1-1 | 1-2 | 1-3 | 1-4 | 1-5 | 2-1 | 2-2 | 2-3 | 2-4 | 2-5 |
|---|---|---|---|---|---|---|---|---|---|---|
| 1-1 |  |  |  |  |  |  |  |  |  |  |
| 1-2 |  |  |  |  |  |  |  |  |  |  |
| 1-3 |  |  |  |  |  |  |  |  |  |  |
| 1-4 |  |  |  |  |  |  |  |  |  |  |
| 1-5 |  |  |  |  |  |  |  |  |  |  |
| 2-1 |  |  |  |  |  |  | ▨ | ▨ | ▨ |  |
| 2-2 |  |  |  |  |  | ▨ |  | ▨ |  |  |
| 2-3 |  |  |  |  |  | ▨ | ▨ |  | ▨ |  |
| 2-4 |  |  |  |  |  | ▨ | ▨ | ▨ |  |  |
| 2-5 |  |  |  |  |  |  |  |  |  |  |

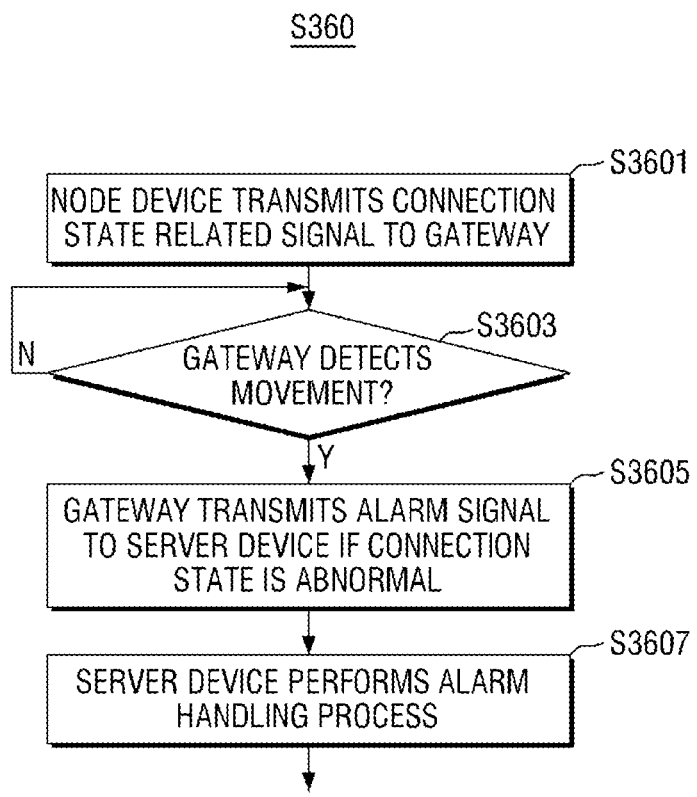

SHORT-RANGE WIRELESS COMMUNICATION NODE DEVICE AND METHOD FOR ALARMING ON THE NODE DEVICE ASSEMBLING STATE

CROSS-REFERENCE TO RELATED APPLICATION(S)

This application claims priority from Korean Patent Application No. 10-2014-0111224, filed on Aug. 26, 2014, in the Korean Intellectual Property Office, the entire disclosure of which is incorporated herein by reference.

BACKGROUND

Field

Apparatuses and methods consistent with one or more exemplary embodiments relate to a short-range wireless communication node device and an alarming method on an assembling state of the node device, and more particularly, to a short-range wireless communication node device that provides a function for intuitively verifying whether all of member node devices belonging to a designated channel are assembled and an alarming method on an assembling state of the node device.

Description of Related Art

A wireless sensor network that uses a short-range wireless communication sensor node has been utilized in various fields. For example, each wireless communication sensor node belonging to a wireless sensor network may autonomously set up a connection with another node through a self-configuration function. Here, a node may not have information about a specific node with which to set up a connection, and thus, may randomly set up a connection with a sensor node, for example, which may be within a distance in which short-range wireless communication is possible.

However, to a configuration method of the wireless sensor network as described above, it is difficult to verify whether all of the member nodes of a channel configured using predetermined sensor nodes are assembled.

SUMMARY

Exemplary embodiments overcome the above disadvantages and other disadvantages not described above. Also, an exemplary embodiment is not required to overcome the disadvantages described above, and an exemplary embodiment may not overcome any of the problems described above.

One or more exemplary embodiments provide a short-range wireless communication node device that may intuitively verify whether a plurality of short-range wireless communication node devices designated to be assembled are substantially assembled, and an alarming method based on an assembling state of the node device.

One or more exemplary embodiments provide a short-range wireless communication node device that is attached to each transportation unit in a one-to-one manner to intuitively verify whether all of the transportation units that are designated to be assembled are assembled, and an alarming method based on an assembling state of the node device.

One or more exemplary embodiments further provide a method of preventing erroneous cargo transportation by automatically reporting to a server device about a situation in which a transportation means on which transportation units are loaded begins to perform transportation in a state in which all of the transportation units designated to be assembled are not substantially assembled.

The exemplary embodiments are not limited to the aforementioned technical subjects, and other technical subjects, which are not mentioned, will be apparently understood by the person skilled in the art from the recitations of the claims.

According to one or more exemplary embodiments, it is possible to intuitively help determine whether all short-range wireless communication node devices that are to be assembled have been assembled.

According to one or more exemplary embodiments, it is possible to intuitively help determine whether all of the transportation units that are to be assembled have been assembled.

According to one or more exemplary embodiments, when a transportation means on which transportation units are loaded begins transportation in a state in which all of the transportation units to be assembled are not assembled, a server device may be quickly notified in order to quickly respond with a follow-up action.

According to an aspect of an exemplary embodiment, there is provided a node device including a network adaptor configured to perform short-range wireless communication, a channel manager configured to receive channel setting information comprising information about channel member nodes through the network adaptor, and to store the received channel setting information, a channel state manager configured to update a channel state table which indicates that the node device is connected to another node device in response to the node device being connected to the other node device through the network adaptor, and to propagate the updated connection state table via the network adaptor, and an alarm controller configured to verify a connection state between the channel member nodes by analyzing the connection state table, and to generate an alarm control signal based on the verified connection state.

According to an aspect of another exemplary embodiment, there is provided, an alarming method on an assembling state of a short-range wireless communication node device, the method including generating, by a server device, channel setting information comprising identifiers of short-range wireless communication node devices in a network which are to be assembled, transmitting, by the server device, the channel setting information to a gateway, broadcasting, by the gateway, the channel setting information using a short-range wireless communication method, receiving and propagating, by a short-range wireless communication node device in the network, the channel setting information to other short-range wireless communication node devices in the network, updating, by each short-range wireless communication node device in the network, a pre-stored connection state table based on a connection or release of a connection with other short-range wireless communication node devices in the network, and propagating the updated connection state table to another respective short-range wireless communication node device in the network, and verifying, by each short-range wireless communication node device in the network, a connection state between channel member nodes by analyzing a stored connection state table, and activating an alarm means provided to at least one short-range wireless communication node device in the network based on the verified connection state.

BRIEF DESCRIPTION OF THE DRAWINGS

The above and other features and advantages will become more apparent by describing one or more exemplary embodiments thereof with reference to the attached drawings in which:

FIGS. 8 through 11 illustrate connection state graphs between channel member nodes determined as a normal connection state or an abnormal connection state based on settings of a connectivity profile in channel setting information of FIG. 5, according to exemplary embodiments;

FIGS. 16 and 17 are tables showing a final update result of a connection state table recorded in each short-range wireless communication node device in the assembling state of FIG. 14, according to exemplary embodiments; and FIG. 18 is a signal flowchart illustrating a server reporting operation about an abnormal connection state in the alarming method about the assembling state of the short-range wireless communication node device of FIG. 12, according to an exemplary embodiment.

DETAILED DESCRIPTION

Figure 1:
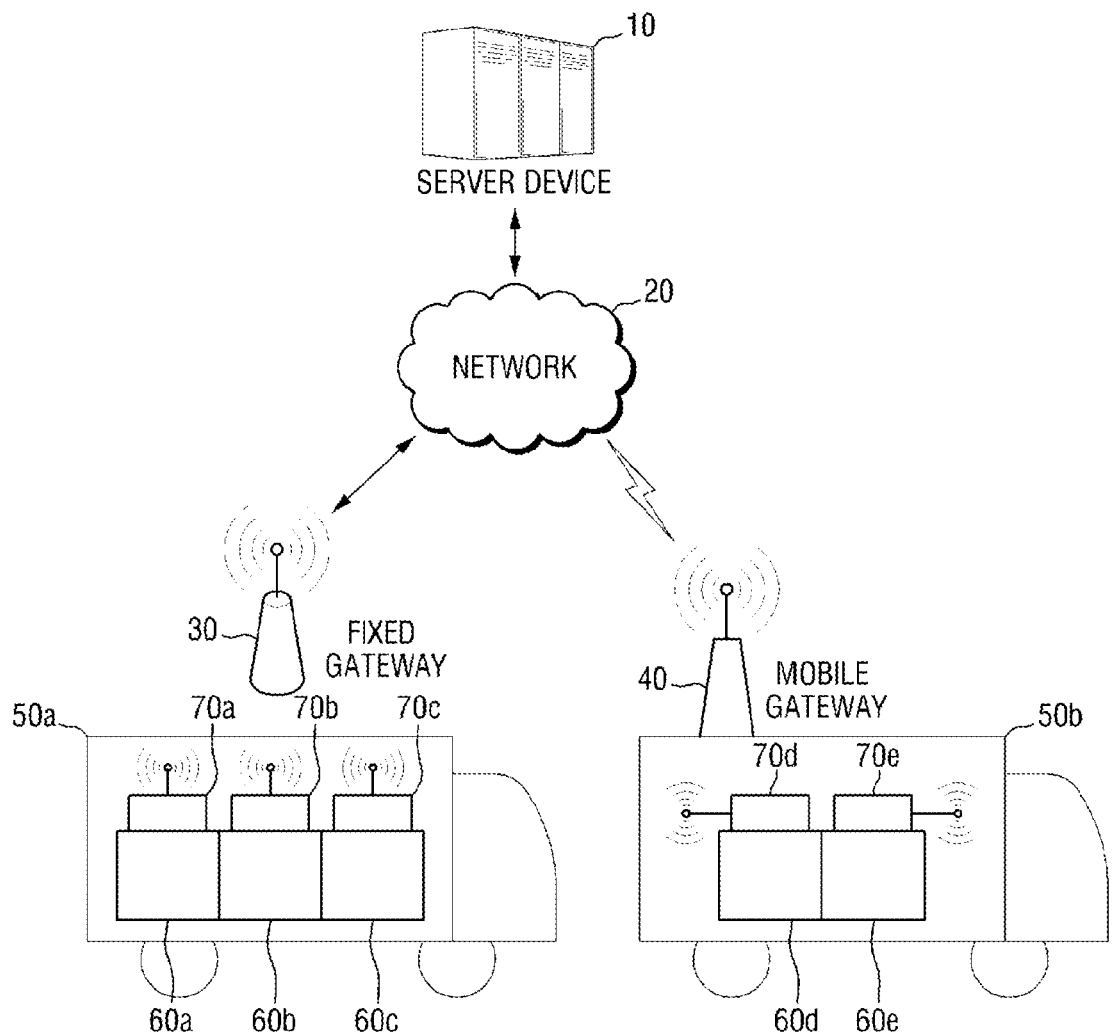
FIG. 1 is a diagram of a self-configuration wireless communication node network system according to an exemplary embodiment.

Advantages and features of the one or more exemplary embodiments and methods of accomplishing the same may be understood more readily by reference to the following detailed description of the exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

The terminology used herein is for the purpose of describing one or more exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it may be directly on, connected or coupled to the other element or layer, or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, and the like, may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

One or more exemplary embodiments may be described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, these one or more exemplary embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the exemplary figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

A logic or a routine in one or more exemplary embodiments may indicate a series of operations executable by a processor and is not limited to an example prepared by a predetermined programming language.

FIG. 1 is a diagram of a self-configuration wireless communication node network system according to an exemplary embodiment. The wireless communication node network system includes a server device 10, a fixed gateway 30, a mobile gateway 40, and a plurality of short-range wireless communication node devices (hereinafter, referred to as "node devices") 70a, 70b, 70c, 70d, and 70e.

The network system according to the exemplary embodiment is a "self-configuration network system". Thus, when another node device located within a communicable distance is found or otherwise discovered, the plurality of node devices 70a, 70b, 70c, 70d, and 70e of the network may connect to and establish a communication session with the found other node device. Accordingly, the mutually adjacent node devices 70a, 70b, and 70c loaded on a first transportation means 50a may configure a network by mutually establishing a communication session with each other, and the mutually adjacent node devices 70d and 70e loaded on a second transportation means 50b may also configure a network by mutually establishing a communication session with each other.

The server device 10 generates channel setting information and transmits the generated channel setting information to the fixed gateway 30 and the mobile gateway 40 through a network 20. When a predetermined site including at least one gateway is designated as a receiver of the channel setting information, the server device 10 may refer to address information of a gateway included in the site designated as the receiver and may transmit the generated channel setting information to gateways included in the site designated as the receiver. Hereinafter, it is assumed that the fixed gateway 30 and the mobile gateway 40 of FIG. 1 belong to the same site. Accordingly, the fixed gateway 30 and the mobile gateway 40 may receive the same channel setting information from the server device 10.

The channel setting information may include information designating a list of node devices to be assembled. The node devices to be assembled constitute a single channel. For example, information about a single channel may be included in the channel setting information or information about a plurality of channels may be included in the channel setting information. An example of a method of configuring channel setting information and an effect by the configuration will be described further herein.

The fixed gateway 30 indicates a gateway that is fixably installed at a predetermined location. For example, the fixed gateway 30 may be fixably installed at a location such as loading workplace such as a dock of a warehouse, an open storage yard, and the like. On the contrary, the mobile gateway 40 may be installed in or on a movable object. In this example, the mobile gateway 40 is installed in the second transportation means 50b in which transportation units 60d and 60e are loaded.

Transportation units 60a, 60b, 60c, 60d, and 60e may indicate a box for packing contents, a palette, a container box, and the like. The node devices 70a, 70b, 70c, 70d, and 70e may be respectively attached to or coupled with the transportation units 60a, 60b, 60c, 60d, and 60e in a one-to-one manner.

According to one or more exemplary embodiments, the node devices 70a, 70b, 70c, 70d, and 70e may communicate with other node devices 70a, 70b, 70c, 70d, and 70e, the fixed gateway 30, and/or the mobile gateway 40 that are located within a communicable distance through a short-range wireless communication method. The short-range wireless communication method may indicate, for example, one of near field communication (NFC), Bluetooth, a wireless local area network (WLAN), and the like, or a communication method applied from the aforementioned communication methods.

According to an exemplary embodiment, the short-range wireless communication method may be Bluetooth 4.0, for example, Bluetooth low energy (BLE). The Bluetooth 4.0 technology consumes a very small amount of power, and thus, it is possible to extend an exchange period or life of a battery provided to the node devices 70a, 70b, 70c, 70d, and 70e.

The node devices 70a, 70b, 70c, 70d, and 70e receive the channel setting information through the short-range wireless communication method, store the received channel setting information, and propagate the received channel setting information to other connected node devices. For example, when one or more of the node devices 70a, 70b, 70c, 70d, and 70e are newly connected to another node device, the node devices 70a, 70b, 70c, 70d, and 70e may update a connection state table with that of the node devices 70a, 70h, 70c, 70d, and 70e connected to the other node device, and propagate the updated connection state table to the connected other node device. Also, the node devices 70a, 70b, 70c, 70d, and 70e may verify a connection state between node devices within the same channel by analyzing the connection state table and generate an alarm means control signal based on the verified connection state.

The node devices 70a, 70b, 70c, 70d, and 70e may operate an alarm means provided to each node device by inputting the alarm means control signal into the alarm means. An example operation and structure of a node device is further described herein.

For example, the alarm means provided to the node device may include a lamp mounted on an external surface of a housing of the node device, a speaker mounted to the node device, and the like. When a node not connected with any of the other channel member nodes is determined to be present among channel member nodes as a result of analyzing the connection state table, it is possible to turn on an alarm such as a red light on the lamp indicating an abnormal connection state. On the contrary, when the connection state between the channel member nodes is determined as a normal connection state as a result of analyzing the connection state table, a blue light on the lamp may be turned on indicating a normal connection state.

For example if it is assumed that the node devices 70a, 70b, 70c, 70d, and 70e are attached at upper ends of product boxes in a one-to-one manner and a lamp is attached on a top surface of a housing of a node device, all the node devices may turn on blue lights when loading is accurately completed, otherwise, all the lamps belonging to a channel in which an error has occurred may be turned on. Accordingly, a loading worker or a manager may intuitively verify whether loading work is accurately performed based on whether each product box is accurately assembled based on the presence or the absence of the alarm.

The node devices 70a, 70b, 70c, 70d, and 70e may also provide the alarm means control signal to an alarm means provided to an external device. For example, the external device may be a loading work management server configured to manage loading work, may be a display or a speaker installed in a loading workplace, and the like.

Figure 2:
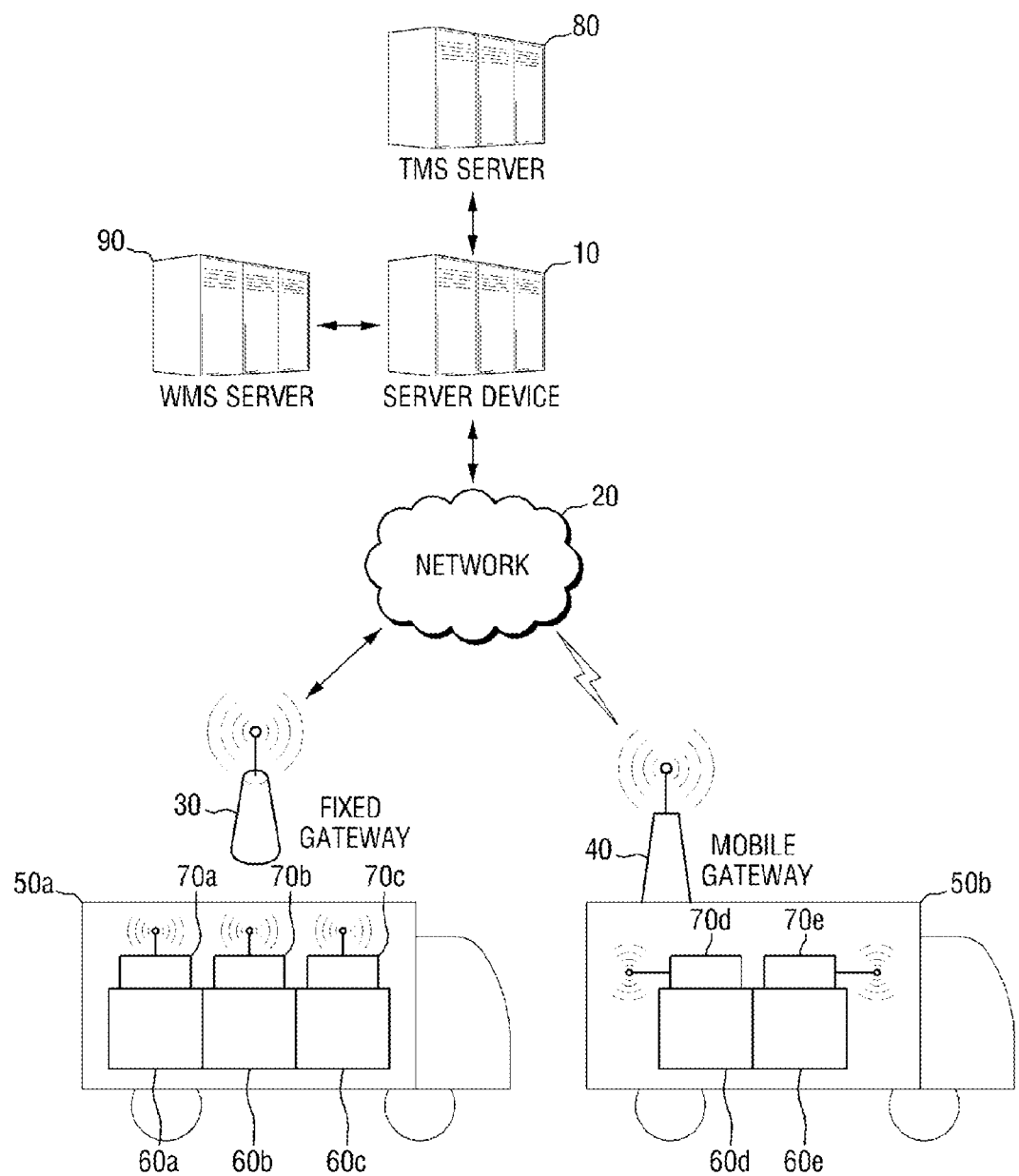
FIG. 2 is a diagram of a self-configuration wireless communication node network system interacting with a distribution execution system according to an exemplary embodiment.

FIG. 2 is a diagram of a self-configuration wireless communication node network system interacting with a distribution execution system according to an exemplary embodiment. As illustrated in FIG. 2, the server device 10 may be connected to at least one of a transportation management system (TMS) server 80 and a warehouse management system (WMS) server 90.

Hereinafter, for the convenience of understanding, a description will be made with the assumption that each of the node devices 70a, 70b, 70c, 70d, and 70e is attached to a product box in a one-to-one manner. The server device 10 matches, one-to-one, an identifier of each product box and an identifier of each node device, and then generates the channel setting information using the matching result.

The server device 10 may generate the channel setting information using information received from the TMS server 80 or the WMS server 90. In addition to information about node devices constituting each channel, a proximity profile indicating a requirement for or otherwise acknowledging that a node device is connected to another node device may be further included in channel setting information. For example, the proximity profile may reflect size information of a transportation unit to which the short-range wireless communication node device is attached, and the like. The size information of the transportation unit may be received from the WMS server 90.

Due to a feature of a wireless signal, the smaller the size of the transportation unit, the greater a strength of a signal received from an adjacent node device may be. On the contrary, the larger the size of the transportation unit, the smaller the strength of the signal received from the adjacent node device may be. The server device 10 may designate a minimum value of a received signal strength (for example, a value indicating a received signal strength indicator (RSSI)) of the proximity profile using the size information of the transportation unit received from the WMS server 90, in order to process a node device that is to be connected to another node device, for example, when each transportation unit is substantially located at an adjacent location (for example, when each transportation unit is stacked right next, right above, or right below). For example, the server device 10 may execute a routine for calculating the minimum value of the received signal strength of the proximity profile from the size of the transportation unit.

As described above, the channel setting information may also include information designating a channel member node for each channel with respect to a plurality of channels. For example, when transportation units in which different products are packed, are to be loaded on a first transportation means and a second transportation means at 50, accurate loading work may need to be performed when destinations of the first transportation means and the second transportation means are different from each other.

For example, channel setting information may be generated such that node devices attached to transportation units that are to be loaded on the first transportation means are configured as a first channel, and node devices attached to transportation units that are to be loaded on the second transportation means are configured as a second channel. For example, a manager or other worker may directly input a channel member node of the first channel and a channel member node of the second channel. The server device 10 may be configured to automatically designate a channel member node of the first channel and a channel member node of the second channel by combining information about a transportation quantity to be transported through each transportation means, received from the TMS server 80, and information about a target quantity to be loaded, received from the WMS server 90.

As illustrated in FIG. 2, by interacting with the distribution execution system, for example, the TMS server 80, the WMS 90, and the server device 10, channel setting information may be automatically set based on transportation work performed by an operation of the distribution execution system.

Examples of channel setting information when only a single channel is designated and a node device network generated based on the channel setting information are described with reference to FIGS. 3 and 4, according to exemplary embodiments.

For example, when loading of a single transportation means is performed, the loading work may be determined to have been accurately performed if all the transportation units that are to be loaded on the transportation means are loaded without omission. In this case, with respect to a single channel, an identifier of a node device attached to a transportation unit that is to be loaded on the transportation means may be designated. In an example in which five transportation units are loaded, a server device may generate channel setting information 100 of FIG. 3.

Figure 4:
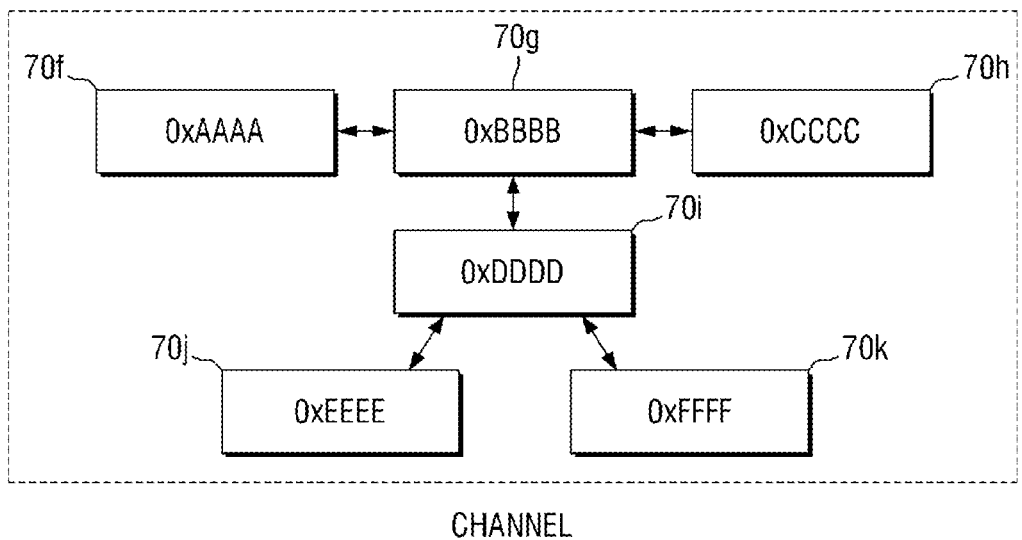
FIG. 4 is a diagram illustrating a wireless communication channel configured based on channel setting information of FIG. 3, according to an exemplary embodiment.

FIG. 4 illustrates a wireless communication connection relationships among six node devices 70f, 70g, 70h, 70i, 70j, and 70k. In this example, each of the node devices 70f, 70g, 70h, 70i, 70j, and 70k has a connection to at least one other node, and thus, each of the node devices 70f, 70g, 70h, 70i, 70j, and 70k is determined to be in a normal connection state. Accordingly, each of the node devices 70f, 70g, 70h, 70i, 70j, and 70k may perform an alarm means operation (for example, turning on a blue light of a lamp) to inform of the normal connection state.

Figure 3:
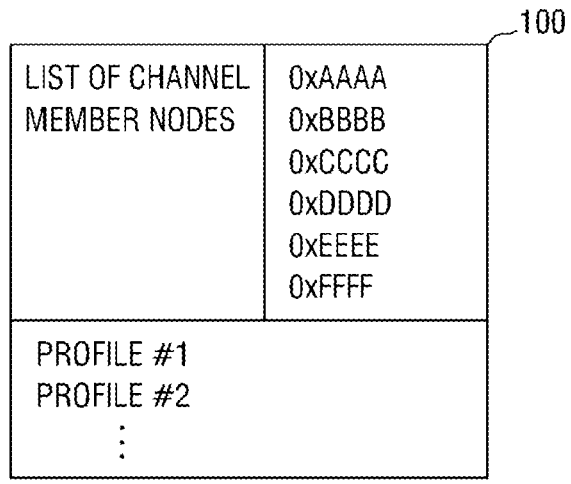
FIG. 3 is a diagram illustrating channel setting information that may be generated and distributed by a server device of FIG. 1 or FIG. 2, according to an exemplary embodiment.

Meanwhile, as illustrated in FIG. 3, in addition to information indicating channel members, the channel setting information 100 may further include information about various criteria or requirements or other information that is used to determine whether node devices belonging to a channel are in a normal assembling state. In this example, information about the criteria or the requirement may be referred to as a "profile". Examples of various profile information included in the channel setting information 100 is further described below.

Figure 5:
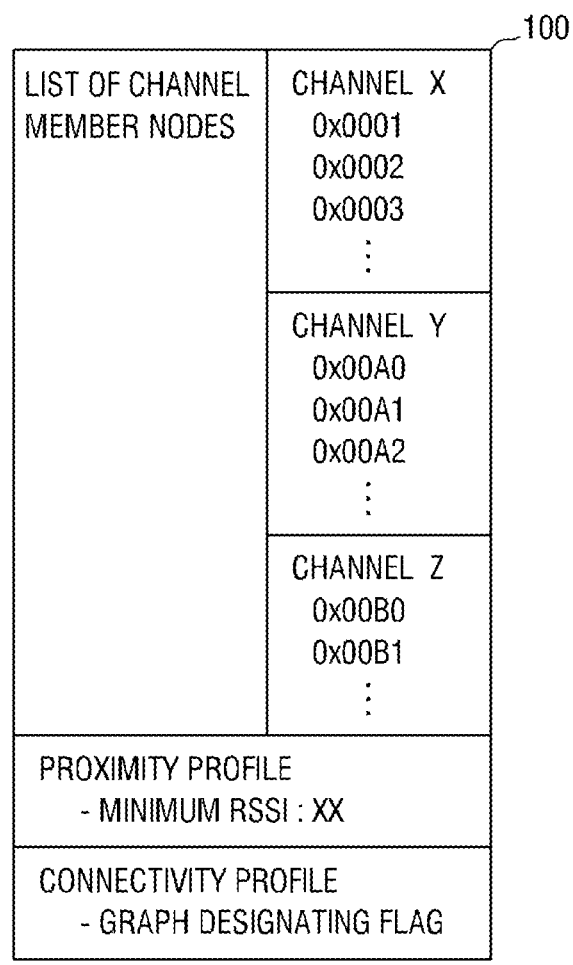
FIG. 5 is a diagram illustrating channel setting information that may be generated and distributed by the server device of FIG. 1 or FIG. 2, according to another exemplary embodiment.

FIG. 5 illustrates channel setting information 100 including information about member nodes constituting each channel with respect to a plurality of channels, according to an exemplary embodiment.

For example, transportation units in which at least a portion of the products are different may be packed and loaded onto a first transportation means, a second transportation means, and a third transportation means. In this example, accurate loading work may be performed even though destinations of the first transportation means, the second transportation means, and the third transportation means are different from one another. In this case, the channel setting information 100 may be generated such that node devices attached to transportation units to be loaded on the first transportation means are configured as a first channel (i.e. channel X), node devices attached to transportation units to be loaded on the second transportation means are configured as a second channel (i.e. channel Y), and node devices attached to transportation units to be loaded on the third transportation means are configured as a third channel (i.e. channel Z). The channel setting information 100 includes channel member node identifiers for each of the three channels.

As described above with reference to FIG. 3, at least one profile may be included in the channel setting information 100. According to one or more exemplary embodiments, each node device having received the channel setting information 100 may determine whether a connection state between member nodes of a channel to which the node device belongs is normal, using the profile.

For example, one of the profiles may be a proximity profile. The proximity profile may designate a requirement or a request for acknowledging that a node device is connected to another node device on a connection state table. That is, each node device may set up a new connection with another node device based on a self-configuration function method using a short-range wireless communication means provided to each node device and may determine whether the new connection satisfies the requirement according to the proximity profile. If it is determined that the new connection does not satisfy the requirement, the new connection is processed to be absent. As described above, a minimum value or threshold value of an RSSI value by the new connection may be included as a connection acknowledgement requirement in the proximity profile. For example, when the minimum value of the RSSI value is designated as −50 dBm, the connection may be acknowledged and the requirement may be met only when the RSSI value by the new connection is greater than −50 dBm.

Another example of a profile is a connectivity profile. Every time a connection state table is updated, a node device may configure a connection state between the node device and a channel member node device belonging to the same channel as the node device, based on the updated connection state table. For example, the connection state may be configured as a graph. The graph may indicate a well-known data structure comprising vertices and nodes. According to one or more exemplary embodiments, the node device configures the graph using each node device as a vertex and using, as an edge, a connection relationship satisfying the proximity profile between the node devices. The node device determines whether a connection state between channel member nodes is normal based on a type of graph. The connectivity profile may be a standard that is used to determine whether the connection state is normal.

The connectivity profile may indicate at least one of a connected graph, a bi-connected graph, a minimum degree limiting type graph, and a complete graph. For example, when the connectivity profile of channel setting information is set as a value indicating the connected graph, a node device that has received the channel setting information may determine that a connection state between channel member nodes is a normal state only when the graph configured from the connection state table is the connected graph.

Figure 6:
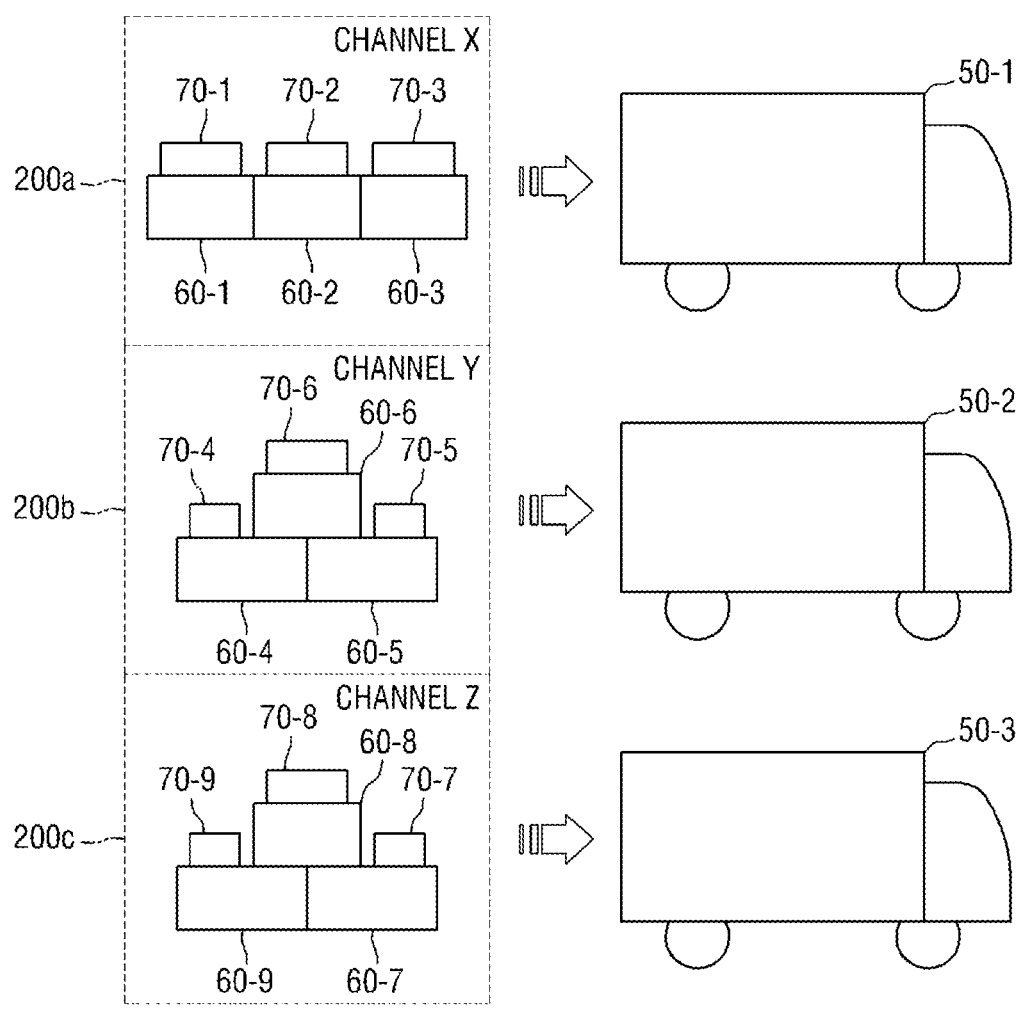
FIG. 6 is a diagram illustrating a plurality of wireless communication channels configured based on channel setting information of FIG. 5, according to an exemplary embodiment.

FIG. 6 illustrates a plurality of wireless communication channels configured based on channel setting information of FIG. 5, according to an exemplary embodiment. FIG. 6 illustrates an example in which node devices included in a channel X are three node devices 70-1, 70-2, and 70-3 attached to three transportation units 60-1, 60-2, and 60-3, respectively, node devices included in a channel Y are three node devices 70-4, 70-5, and 70-6 attached to three transportation units 60-4, 60-5, and 60-6, respectively, and node devices included in a channel Z are three node devices 70-7, 70-8, and 70-9 attached to three transportation units 60-7, 60-8, and 60-9, respectively. In this example, the three transportation units 60-1, 60-2, and 60-3 are to be loaded on a first transportation means 50-1, the three transportation units 60-4, 60-5, and 60-6 are to be loaded on a second transportation means 50-2, and the three transportation units 60-7, 60-8, and 60-9 are to be loaded on a third transportation means 50-3. Accordingly, the server device may generate channel setting information such that each channel may be configured as illustrated in FIG. 6.

Figure 7:
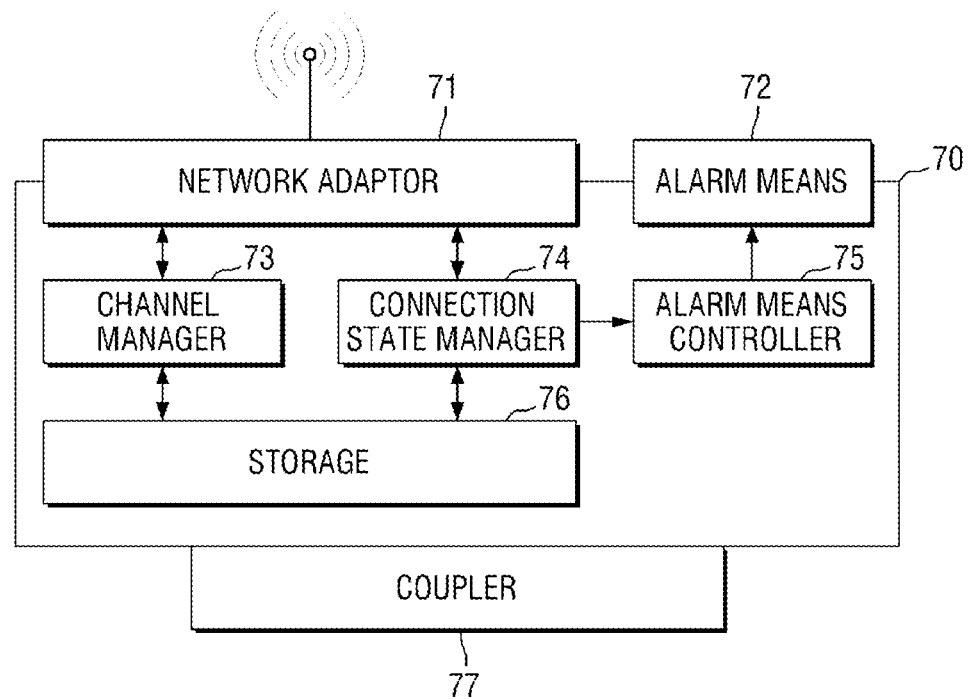
FIG. 7 is a diagram of a short-range wireless communication node device according to an exemplary embodiment.

Hereinafter, a short-range wireless communication node device 70 according to an exemplary embodiment is described with reference to FIG. 7. As illustrated in FIG. 7, the short-range wireless communication node device 70 includes a network adaptor 71, a channel manager 73, a connection state manager 74, and an alarm means controller 75. FIG. 7 also illustrates an example in which an alarm means 72 is included in the node device 70. As another example, the alarm means 72 may be included in an external device that is located physically separate from the node device 70.

The node device 70 may be used for verifying whether a communication node device itself is assembled, however, may also be used for verifying whether another attached entity is assembled. Accordingly, for example, the node device 70 may further include a housing (not shown), and a coupler 77 detachably attached to another entity that may be provided on at least one surface of the housing. The coupler 77 may be configured using a variety of attaching/coupling means in a detachable form, such as Velcro and the like.

The node device 70 includes a storage 76 that may store channel setting information, a connection state table, and an identifier of the node device 70. The node device 70 may be detachably attached to another entity, and thus, the storage 76 may include a non-volatile memory, for example, a flash memory to decrease a size of the node device 70.

The network adaptor 71 may support short-range wireless communication. The short-range wireless communication may be, for example, one of NFC, Bluetooth, and WLAN, or a communication method applied from the aforementioned communication methods.

The channel manager 73 receives channel setting information including information about channel member nodes through the network adaptor 71, and may store the received channel setting information in the storage 76.

The channel manager 73 may update channel setting information, for example, from a gateway or another node device. That is, the channel manager 73 may receive channel setting information from the gateway or the other node device, may update pre-stored channel setting information when a version of the received channel setting information is greater than a version of the pre-stored channel setting information, and may transmit the pre-stored channel setting information to another newly connected another device when the node device 70 is newly connected to the other node device through the network adaptor 71.

When the node device 70 is connected to another node device through the network adaptor 71, the connection state manager 74 updates the connection state table pre-stored in the storage 76 based on the node device 70 being connected to the other node device and propagates the updated connection state table through the network adaptor 71. For example, the channel setting information may further include a proximity profile indicating a requirement for acknowledging that the node device 70 is connected to the other node device. When the node device 70 is connected to the other node device through the network adaptor 71 and satisfies the requirement according to the proximity profile, the connection state manager 74 may update the connection state table with that of the node device 70 connected to the other node device.

The connection state manager 74 may also receive a connection state table from another node device. For example, the connection state manager 74 may determine whether the received connection state table is different from that of a pre-stored connection state table, may update the pre-stored connection state table with the received connection state table only when the received connection state table is different from the pre-stored connection state table, and may propagate the received connection state table to another node device excluding the other node device having transmitted the received connection state table, thereby preventing the propagation of the connection state table from continuously repeating.

The connection state manager 74 may transmit the connection state table to a mobile gateway that is provided to a transportation means. In this example, the gateway may verify a connection state between channel member nodes by analyzing the connection state table. As a result, when the connection state between the channel member nodes is abnormal with respect to at least one channel, and in response to a location movement of the gateway being detected, the gateway may transmit information about the abnormal connection state to the server device.

The alarm controller 75 verifies the connection state between the channel member nodes by analyzing the connection state table, and generates an alarm means control signal based on the verified connection state. For example, the alarm means control signal may correspond to an alarm.

Instead of the connection state manager 74, the alarm means controller 75 may also transmit data about the connection state between the channel member nodes to a mobile gateway which is provided to a transportation means. When the gateway detects the location movement of the gateway in the abnormal connection state between the channel member nodes with respect to at least one channel, the gateway may transmit information about the abnormal connection state to the server device.

Each time a connection state table is updated, the alarm means controller 75 may configure, as a graph, a connection state between the node device and a channel member node device belonging to the same channel as the node device based on the updated connection state table. For example, the alarm means controller 75 may configure the graph using each node device as a vertex and using, as an edge, a connection relationship satisfying the proximity profile between the node devices. As an example in one or more exemplary embodiments, the edge refers to a connection point between a node being connected to another node where the edge refers to the edge of the circle in the drawing of the node in which the line is connected. The alarm means controller 75 determines whether the connection state between the channel member nodes is normal based on whether the graph satisfies the requirement described in the connectivity profile.

According to one or more exemplary embodiments, the connectivity profile may indicate one of a connected graph, a bi-connected graph, a minimum degree limiting type graph, a complete graph, and the like. The strictness of the connectivity may increase in an order of the connected graph, the bi-connected graph, the minimum degree limiting type graph, and the complete graph. In other words, when the configured graph is the connected graph, the connection state between the channel member nodes may be determined to be normal. That is, the alarm controller 75 may analyze the connection state table, and may generate a control signal indicating an abnormal connection state between channel member nodes when a node not connected from any of the other channel member nodes is present among channel member nodes.

Hereinafter, an operation of the alarm means controller 75 is described in more detail with reference to FIGS. 8 through 11, according to exemplary embodiments.

Figure 8:
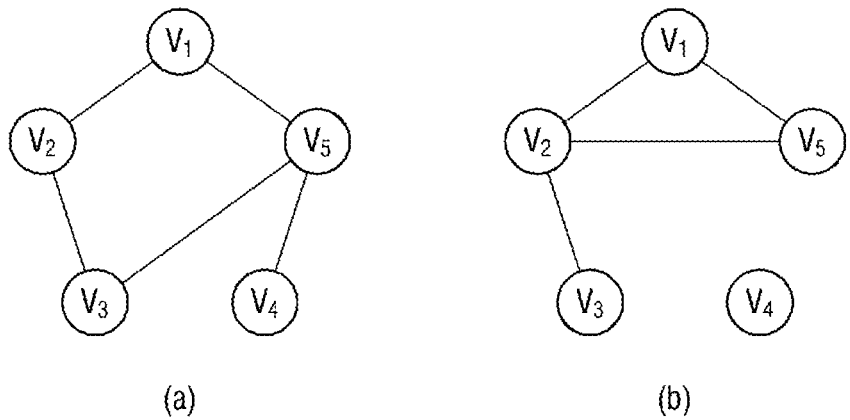

For example, if the connectivity profile designates the connected graph, all of the vertices of the configured graph may have at least one edge. In FIG. 8, graph (a) is an example of the connected graph and graph (b) is an example of a graph that is not connected. Accordingly, when the configured graph is the connected graph (a), the alarm means controller 75 determines that the connection state between the channel member nodes is normal. However, when the configured graph is graph (b), the alarm means controller 75 determines that the connection state between the channel member nodes is abnormal because at least one node is not connected, in this example, node $V_4$.

As another example, if the connectivity profile designates a bi-connected graph, the configured graph needs to be the connected graph even after a predetermined vertex is removed from the configured graph. Graph (a) of FIG. 9 is the bi-connected graph and graph (b) of FIG. 9 is not a bi-connected graph because a graph that remains when a vertex $V_5$ is removed is not the connected graph. Accordingly, when the configured graph is graph (a), the alarm means controller 75 determines that the connection state between the channel member nodes is normal. However, when the configured graph is graph (b), the alarm means controller 75 determines that the connection state between the channel member nodes is abnormal.

As another example, if the connectivity profile designates a minimum degree limiting type graph, a smallest value among degrees of each vertex of the configured graph needs to be greater than a designated value. In this example, a degree of a predetermined vertex indicates the number of edges connected to the vertex. For example, as illustrated in FIG. 10, the minimum degree of each vertex is designated as "2." Accordingly, graph (a) of FIG. 10 is "2" of $V_1$ and $V_3$ and thus, satisfies the minimum degree limiting type graph. For example, each of the vertexes in graph (a) of FIG. 10 is connected to at least two other vertexes. On the contrary, graph (b) of FIG. 10 does not satisfy the minimum degree limiting type graph because the minimum degree of $V_4$ is "1." Accordingly, when the configured graph is graph (a), the alarm means controller 75 determines that the connection state between the channel member nodes is normal. However, when the configured graph is graph (b), the alarm means controller 75 determines that the connection state between the channel member nodes is abnormal.

As another example, if the connectivity profile designates a complete graph, all of the vertices of the configured graph need to have an edge connection with all other vertices excluding a corresponding vertex. As an example, the complete graph configured using five vertices is illustrated FIG. 11. In this example, the alarm means controller 75 determines that the connection state between the channel member nodes is normal. However, when the configured graph is not configured as in the graph of FIG. 11, the alarm means controller 75 determines that the connection state between the channel member nodes is abnormal.

The alarm means 72 performs an alarming function according to a control of the alarm means controller 75. For example, the alarm means 72 is configured as a lamp. Every time the connection state table is updated, the alarm means controller 75 regenerates the alarm means control signal in real time. The alarm means control signal may a lamp control signal used to indicate whether loading of various products destined for the (for example, turning on a blue light) indicating a normal connection state between channel member nodes and a lamp control signal (for example, turning on a red light) indicating an abnormal connection state between channel member nodes.

In another exemplary embodiment, the alarm means 72 is configured as a speaker, and the alarm means control signal may be one of a speaker control signal (for example, a silent sound) indicating a normal connection state between channel member nodes and a speaker control signal (for example, a regular beep sound output) indicating an abnormal connection state between channel member nodes.

As another exemplary embodiment, the alarm means 72 may be installed in an external device present at a location that is separate from the node device 70. For example, the external device may be a loading work management server configured to manage loading work or may be a display or a speaker installed in a loading workplace.

Meanwhile, an example in which the channel setting information received by the channel manager 73 includes information about member nodes included in each channel with respect to a plurality of channels (that is, in a case of a plural channel environment) is described.

In this example, the alarm means controller 75 may generate a connection state between node devices "within the same channel" by analyzing the connection state table which may be used to generate an alarm means control signal based on the verified connection state. That is, each of the node devices does not apply a connection state of a channel not that belongs thereto by the node device to the control of the alarm means 72 and applies only a connection state of a channel that belongs thereto by the node device to the control of the alarm means 72.

Also, the connection state manager 74 may verify a channel belonging thereto by another node device that is connected through the network adaptor 71 using the channel setting information, may update the connection state table with that of the node device 70 connected to the other node device only when the other node device "belongs to the same channel", and may propagate the updated connection state table to another node device belonging to the same channel.

According to one or more exemplary embodiments, regardless of whether a channel belonging thereto by another node device connected through the network adaptor 71 is the same as the channel of a node device, the connection state manager 74 may also update the connection state table. In this example, when the connection state table is verified, it is possible to find a location of a node device presently alone or not connected at a location adjacent to node devices of another channel.

Also, the channel manager 73 may receive channel setting information from a gateway or from another node device, may update pre-stored channel setting information when a version of the received channel setting information is higher or more recent than a version of the pre-stored channel setting information, and may transmit the pre-stored channel setting information to newly connected other node device when a node device is newly connected to the other node device through the network adaptor 71. In this example, the channel manager 73 may receive or transmit the channel setting information regardless of whether the other node device belongs to the same channel. For example, even in a plural channel environment, receiving and updating of channel setting information between node devices belonging to different channels may be performed without causing an issue.

Each constituent element of FIG. 7 may indicate software or hardware such as a field-programmable gate array (FPGA) or an application-specific integrated circuit (ASIC). However, the exemplary elements are not limited to software or hardware and may be configured to be present in an addressable storage media and may also be configured to execute one or more processors. A function provided from the constituent elements may be configured by a further segmented constituent element. A plurality of constituent elements may be configured as a single constituent element configured to perform a predetermined function.

Hereinafter, an alarming method on an assembling state of a short-range wireless communication node device according to various exemplary embodiments are described with reference to FIGS. 12 through 18.

Initially, an example of the overall operation is described with reference to FIG. 12.

Figure 12:
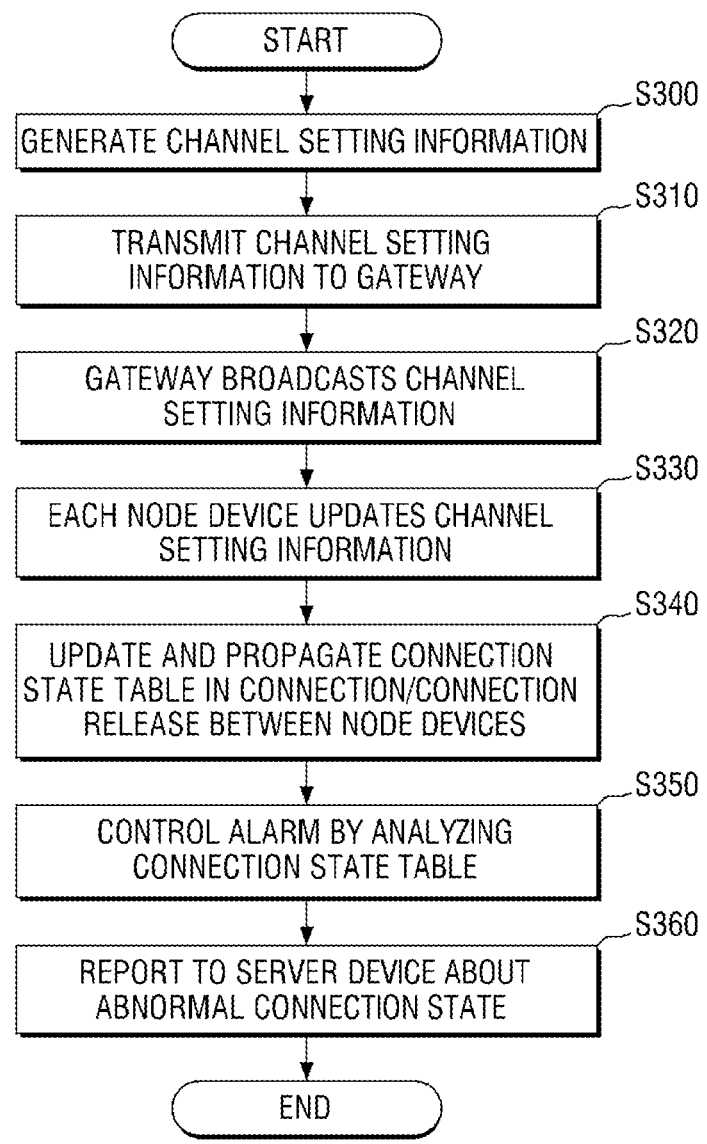
FIG. 12 is a flowchart of an alarming method on an assembling state of a short-range wireless communication node device according to an exemplary embodiment.

Referring to FIG. 12, a server device generates channel setting information (S300). In this example, the server device generates channel setting information further including a proximity profile indicating a request for acknowledging that the node device is connected to another node device. The proximity profile may be set to reflect size information of a transportation unit to which the short-range wireless communication node device is attached, in the acknowledging that the node device is connected to another node device. For example, the size information of the transportation unit may be received from a warehouse management system.

Also, the channel setting information may include identifiers of short-range wireless communication node devices constituting each channel with respect to a plurality of channels. For example, each channel may be allocated to each transportation means on which a transportation unit of which the short-range wireless communication node device is attached and is to be loaded. The server device may receive, from a transportation management system, information about a transportation quantity to be transported through each transportation means.

When a predetermined site including at least one gateway is designated as a receiver of the channel setting information, the server device may refer to address information of a gateway included in the site designated as the receiver and then transmit the generated channel setting information to gateways included in the site designated as the receiver (S310).

The gateway having received the channel setting information from the server device, broadcasts the received channel setting information (S320). Accordingly, at least one node device located within short-range wireless communication coverage of the gateway may receive the channel setting information.

Pre-stored channel setting information may be present in each node device. Also, the channel setting information may be updated (S330). Accordingly, each node device may update the channel setting information from the gateway or the connected other node device. A version may be allocated to the channel setting information to determine whether to perform an update. Hereinafter, an example of a method of updating, by each node device, channel setting information is described with reference to FIG. 13.

In this example, it is assumed that each of node device #1 and node device #2 records version 1.0 of the channel setting information. Also, it is assumed that only the node device #2 is located within short-range wireless communication coverage of a gateway.

When a server device broadcasts version 1.1 of the channel setting information through the gateway, only the node device #2 located within the short-range wireless communication coverage of the gateway receives the 1.1 version of channel setting information transmitted from the server device (S3301). As a result, the node device #2 compares a previously stored version of the channel setting information to a version of the newly received channel setting information (S3303). If the version of the newly received channel setting information is higher than the version of the previously-stored channel setting information, the node device #2 updates the pre-stored channel setting information with the newly received channel setting information (S3305).

Figure 13:
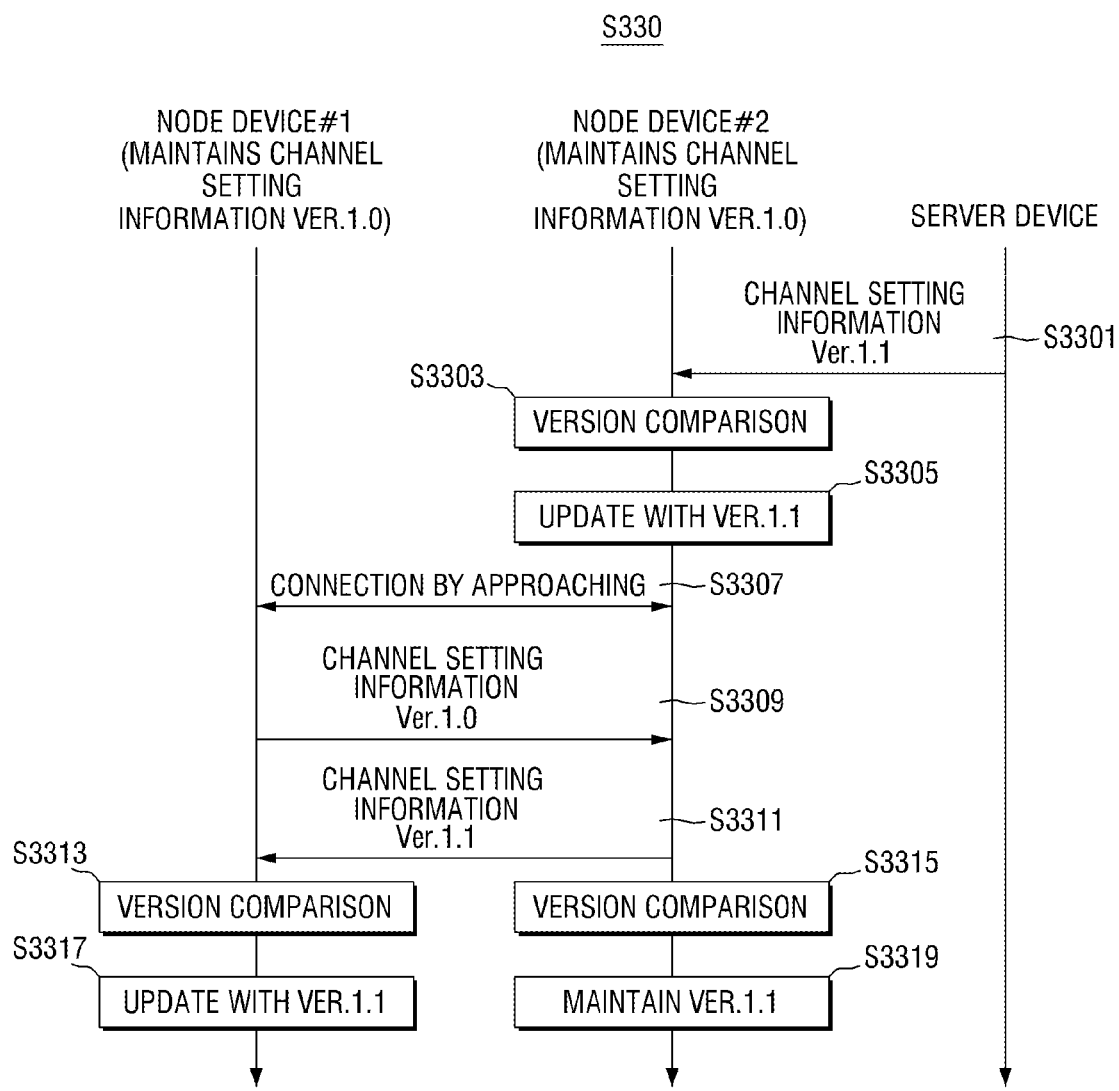
FIG. 13 is a signal flowchart illustrating a channel setting information update operation in the alarming method on the assembling state of the short-range wireless communication node device of FIG. 12, according to an exemplary embodiment.

When a new connection between the node devices #1 and #2 is set up (S3307), each of the node devices #1 and #2 provides its own channel setting information to respective counter party node devices (S3309 and S3311). Next, each of the node devices #1 and #2 may compare a version of pre-stored channel setting information to a version of newly received channel setting information (S3313 and S3315). In the example of FIG. 13, only the node device #1 may perform update of channel setting information (S3317), and the node device #2 may maintain existing channel setting information (S3319).

Referring again to FIG. 12, after each node device updates channel setting information (S330), a connection or a connection release may be performed by a change in a location of each node device (for example, according to a work progress of loading work). At this time, the connection state table is updated and propagated (S340). An example of a connection state table update process of each node device is described with reference to FIGS. 14 through 17.

Figures 14, 15:
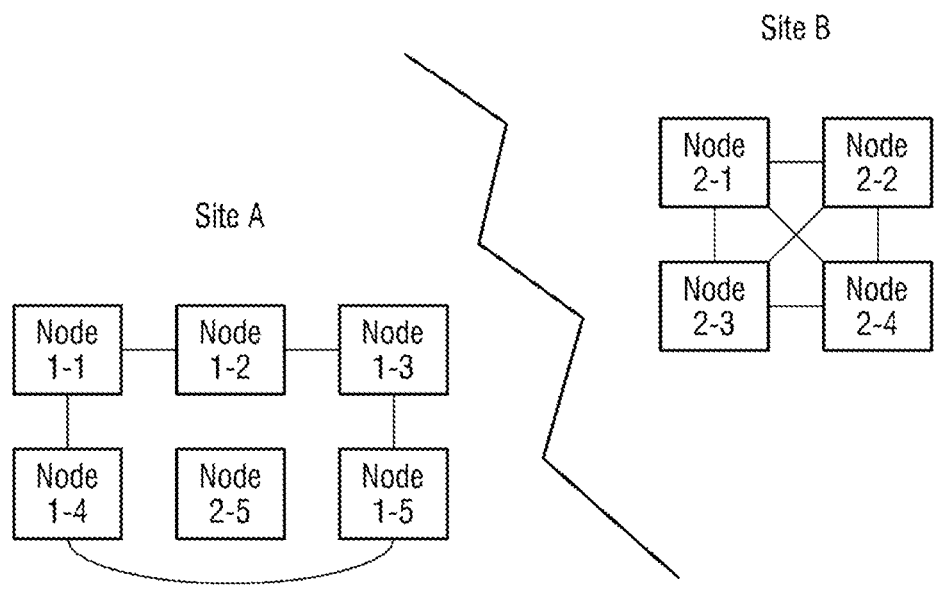
FIG. 14 is a diagram illustrating a state in which short-range wireless communication node devices are inaccurately assembled, according to an exemplary embodiment.
FIG. 15 is a table showing an initial state of a connection state table configured using two channels, according to an exemplary embodiment.

According to one or more exemplary embodiments, channel setting information in which node devices 1-1, 1-2, 1-3, 1-4, and 1-5 which constitute a single channel and node devices 2-1, 2-2, 2-3, 2-4, and 2-5 which constitute another channel may be recorded in each of the node devices 1-1, 1-2, 1-3, 1-4, and 1-5, and 2-1, 2-2, 2-3, 2-4, and 2-5. Also, it is assumed that a site A and a site B are located at a separate distance so that node devices located in the site A and the site B do not or otherwise are not able to communicate with each other. Then, it can be known from FIG. 14 that the node 2-5 is located at a wrong location. In FIG. 14, a connection relationship between nodes is indicated. Although the node 2-5 is adjacent to the node 1-2, 1-4, 1-5, and the like, their channels are different from each other. Accordingly, it is assumed that the node 2-5 is not checked to be connected on the connection state table.

FIG. 15 is a table illustrating an initial state of a connection state table including two channels. That is, the connection state table may be configured in a two-dimensional (2D) data matrix form to check ON/OFF of all the connection relationships between the nodes 1-1, 1-2, 1-3, 1-4, and 1-5 belonging to a first channel and the nodes 2-1, 2-2, 2-3, 2-4, and 2-5 belonging to a second channel.

FIG. 16 illustrates a final connection state table of nodes (nodes 1-1, 1-2, 1-3, 1-4, and 1-5) belonging to the first channel. In FIG. 16, a cell that includes blocks which include a darker line indicate that a connection state is present. Hereinafter, an example of a process of sharing, by nodes (nodes –1, 1-2, 1-3, 1-4, and 1-5), the same connection state table is described. The nodes (nodes 1-1, 1-2, 1-3, 1-4, and 1-5) have the connection state table as illustrated in FIG. 15 in an initial stage.

The node 1-1 updates a connection relationship between nodes, for example, the node 1-1 and the node 1-2 and a connection relationship between the node 1-1 and the node 1-4 with "ON" by updating the connection state table at a point in time at which the node 1-1 is connected to the node 1-2 and the node 1-4, and propagates the updated connection state table to the node 1-2 and the node 1-4.

Because the connection state table propagated from the node 1-1 is different from a connection state table recorded in the node 1-2, the node 1-2 updates its connection state table with the propagated connection state table. Next, at a point in time at which the node 1-2 is connected to the node 1-3, the node 1-2 updates a connection relationship between the node 1-2 and the node 1-3 with "ON", and may propagate the updated connection state table to the node 1-1 and the node 1-3.

Because the connection state table propagated from the node 1-2 is different from a connection state table recorded in the node 1-3, the node 1-3 updates its connection state table with the propagated connection state table. Next, at a point in time at which the node 1-3 is connected to the node 1-5, the node 1-3 may update a connection relationship between the node 1-3 and the node 1-5 with "ON", and propagate the updated connection state table to the node 1-2 and the node 1-5.

Because the connection state table propagated from the node 1-3 is different from the connection state table recorded in the node 1-5, the node 1-5 may update its connection state table with the propagated connection state table. Next, at a point in time at which the node 1-5 is connected to the node 1-4, the node 1-5 updates a connection relationship between the node 1-5 and the node 1-4 with "ON", and propagates the updated connection state table to the node 1-3 and the node 1-4.

Because the connection state table propagated from the node 1-5 is different from the connection state table recorded in the node 1-4, the node 1-4 updates its connection state table with the propagated connection state table. The connection state table at this time may be the same as illustrated in FIG. 16. However, in this one example the completed connection state table as illustrated in FIG. 16 is exemplified by the node 1-4 only. Each node propagates an updated connection state table even to connect to another node when updating the connection state table, and thus, the connection state table illustrated in FIG. 16 is propagated to the nodes 1-1, 1-2, 1-3, and 1-5.

Meanwhile, although a connection is released while a location of a connected node becomes extends beyond a particular distance, a connection state table is updated and the updated connection state table is shared by nodes belonging to the same channel. To this end, a connection state between connected nodes may be periodically or aperiodically checked and/or updated.

In an example in which a connection between the node 1-1 and the node 1-2 is released as shown in FIG. 14, the node 1-1 may become aware that the connection with the node 1-2 is released through a periodical check about the connection state with the node 1-2. For example, the node 1-1 may update a connection relationship with the node 1-2 with "OFF" on the connection station table and propagates the updated connection state table to the node 1-4.

Because the connection state table propagated from the node 1-1 is different from the connection state table recorded in the node 1-4, the node 1-4 may update its connection state table with the propagated connection state table. The node 1-4 propagates the updated connection state table to the node 1-5. Similarly, the node 1-5 updates its connection state table with the connection state table propagated from the node 1-4 and propagates the updated connection state table to the node 1-3.

Meanwhile, the node 1-2 may become aware that the connection with the node 1-1 has been released. In this example, the node 1-2 may update a connection relationship with the node 1-1 with an "OFF" status on the connection state table, and propagate the updated connection state table to the node 1-3.

Meanwhile, the node 1-3 may compare the connection state table propagated from the node 1-2 to the connection state table recorded in the node 1-3. However, at this point, the node 1-3 may have received, from the node 1-5, a latest connection state table in which the release of the connection between the node 1-1 and the node 1-2 is applied. Accordingly, the node 1-3 may become aware that the propagated connection state table is identical to the connection state table recorded in the node 1-3 as the comparison result. Accordingly, the node 1-3 may not perform an additional operation and a connection state update propagation from the node 1-1 and the node 1-2 is terminated.

When a new connection between nodes is generated or when an existing connection is released, two connection state tables of both of the respective nodes may be updated and be propagated to adjacent nodes. In this example, a propagated connection state table may be identical to a connection state table already recorded in a predetermined node, and thus, the predetermined node may not perform the propagating of the connection state table anymore. Accordingly, it is possible to prevent the connection state table from being continuously propagated. A node in which the propagation of the connection state table will be terminated may be affected by a variety of factors such as a communication rate between nodes and a computing rate of each node.

FIG. 17 illustrates a final connection state table of nodes (nodes 2-1, 2-2, 2-3, 2-4, and 2-5) of a second channel that is located in site B.

When it is assumed that channel setting information stored in the each of the nodes (nodes 1-1, 1-2, 1-3, 1-4, and 1-5 and nodes 2-1, 2-2, 2-3, 2-4, and 2-5) has designated a connected graph as a connectivity profile, a channel including the nodes 1-1, 1-2, 1-3, 1-4, and 1-5 configures the connected graph, and is thus in a normal connection state. A channel including the nodes 2-1, 2-2, 2-3, 2-4, and 2-5 does not configure the connected graph, and is thus in an abnormal connection state. One example of the alarm means of the nodes 1-1, 1-2, 1-3, 1-4, and 1-5 may indicate the normal connection state (for example, such as turning on a blue light in a lamp) and all the alarm means of the nodes 2-1, 2-2, 2-3, 2-4, and 2-5 may indicate the abnormal connection state (for example, such as turning on a red light in the lamp).

Referring again to FIG. 12, when the connection state table is updated and propagated, the server device generates a graph in which each channel member node is used as a vertex using the connection state table and uses a connection between channel member nodes as an edge, determines whether the generated graph is a graph corresponding to the connectivity profile, and controls the alarm means based on the determination result (S350).

When the abnormal connection state occurs, information about the abnormal connection state may be reported to the server device (S360). As an example, a situation in which information about the abnormal connection state is reported to the server device is described with reference to FIG. 18.

FIG. 18 illustrates a flowchart illustrating a server reporting operation about an abnormal connection state in an alarming method about an assembling state of the short-range wireless communication node device of FIG. 1.

When the node device transmits a connection state related signal to a gateway (S3601), the gateway continuously updates the received connection state related signal for each channel.

The gateway may monitor whether a location of the gateway has moved by including a location measurement means (for example, a global positioning system (GPS) receiver), and the like. When the gateway detects movement (S3603), the gateway determines whether a connection state is abnormal with respect to at least one channel. When even only a single channel is in the abnormal connection state at a moving point in time of the gateway, the gateway transmits an alarm signal to the server device (S3605). The server device receives the alarm signal and performs a responding process (S3607).

According to one or more exemplary embodiments, when a transportation means has started without restoring an error regardless that each of the node devices has triggered an alarm against inaccurate loading work, the gateway installed in the transportation means may inform the server device of this situation and the server device may take action by transmitting a message requesting a driver.

One or more exemplary embodiments may be configured as a non-transitory computer-readable code on computer-readable media. The computer-readable media may be, for example, mobile recording media (CD, DVD, Blu-ray disc, a USB storage device, and a mobile hard disc) or fixed recording media (ROM, RAM, hard disc embedded in a computer). The computer program recorded in the computer-readable media may be transmitted to another computing device through a network such as the Internet and may be installed in the other computing device, thereby becoming available in the other computing device.

The foregoing is illustrative of the present invention and is not to be construed as limiting of the exemplary embodiments. Although a few embodiments of the present invention have been described, those skilled in the art will readily appreciate that many modifications are possible in the embodiments without materially departing from the novel teachings and advantages of the present invention. Accordingly, all such modifications are intended to be included within the scope of the present invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The present invention is defined by the following claims, with equivalents of the claims to be included therein.

What is claimed is:

1. A wireless communication node device, the node device comprising:
   a network adaptor configured to perform short-range wireless communication;
   a channel manager configured to receive channel setting information comprising information about channel member nodes, through the network adaptor, to store the received channel setting information, and to propagate the stored information via the network adaptor;
   a channel state manager configured to update a channel state table which indicates that the node device is connected to another node device, in response to the node device being connected to the other node device through the network adaptor, and to propagate the updated connection state table via the network adaptor; and an alarm controller configured to verify a connection state between the channel member nodes by analyzing the connection state table, and to generate an alarm control signal based on the verified connection state, wherein the alarm controller is configured to generate a control signal indicating an abnormal connection state between the channel member nodes when a node not connected with any of the other channel member nodes is present among the channel member nodes as a result of analyzing the connection state table.

2. The node device of claim 1, further comprising:
an alarm configured to generate an alarm function according to a control of the alarm controller.

3. The node device of claim 2, wherein the alarm comprises a lamp,
the alarm controller is configured to regenerate the alarm control signal in real time every time the connection state table is updated, and
the alarm control signal is one of a lamp control signal indicating a normal connection state between the channel member nodes and a lamp control signal indicating an abnormal connection state between the channel member nodes.

4. The node device of claim 1, wherein the channel setting information further comprises a proximity profile indicating a request for acknowledging that the node device is connected to the other node device, and
the connection state manager is configured to update the connection state table with that of the node device connected to the other node device when the node device is newly connected to the other node device through the network adaptor and the new connection satisfies the request according to the proximity profile.

5. The node device of claim 1, wherein the channel setting information further comprises a connectivity profile indicating a connection intensity between the channel member nodes for acknowledging the connection state as a normal connection state, and
the alarm controller is configured to generate a graph comprising each channel member node as a vertex and a connection between the channel member nodes as an edge using the connection state table, determine whether the generated graph is a graph corresponding to the connectivity profile, and generate an alarm control signal based on a result of the determining.

6. The node device of claim 5, wherein the connectivity profile indicates one of a connected graph, a bi-connected graph, a minimum degree limiting type graph, and a complete graph.

7. The node device of claim 1, wherein the channel manager is configured to receive the channel setting information from a gateway or another node device, update pre-stored channel setting information when a version of the received channel setting information is higher than a version of the pre-stored channel setting information, and transmit the pre-stored channel setting information to newly connected other node device in response to the node device being newly connected to the other node device through the network adaptor.

8. The node device of claim 7, wherein the node device is attached to a transportation unit that is to be loaded on a transportation means, and the gateway is a mobile gateway provided in the transportation means.

9. The node device of claim 7, wherein the connection state manager is configured to transmit the connection state table to the gateway.

10. The node device of claim 1, wherein the connection state manager is configured to determine whether a connection state table received from another node device is different from a pre-stored connection state table, update the pre-stored connection state table with the received connection state table in response to the received connection state table being different from the pre-stored connection stable table, and propagate the updated connection state table to another node device excluding the other node device that transmitted the received connection state table.

11. The node device of claim 1, wherein the channel setting information comprises information about member nodes that constitute each channel, from among a plurality of channels, and
the alarm controller is configured to verify a connection state between node devices that belong to the channel of the node device by analyzing the connection state table, and generate an alarm control signal based on the verified connection state.

12. The node device of claim 11, wherein the channel manager is configured to receive channel setting information from a gateway or other node device, update pre-stored channel setting information in response to a version of the received channel setting information being higher than a version of the pre-stored channel setting information, transmit the pre-stored channel setting information to newly connected another node device when the node device is newly connected to the other node device through the network adaptor, and receive or transmit the channel setting information regardless of whether the other node device and the node device belong to the same channel.

13. The node device of claim 12, wherein the connection state manager is configured to verify a channel belonging thereto by the other node device based on the channel setting information, update the connection state table with that of the node device connected to the other node device in response to the other node device and the device belonging to the same channel, and propagate the updated connection state table to another node device belonging to the same channel.

14. An alarming method performed by a short-range wireless communication node device of a plurality of short-range wireless communication node devices in a network which are to be assembled, the method comprising:
receiving and storing channel setting information comprising identifiers of the plurality of short-range wireless communication node devices;
propagating the channel setting information to other short-range wireless communication node devices in the network;
updating a pre-stored connection state table based on a connection or release of a connection with another short-range wireless communication node device of the plurality of short-range wireless communication node devices in the network;
propagating the updated connection state table to another respective short-range wireless communication node device in the network; and
verifying a connection state between channel member nodes by analyzing a stored connection state table, and activating an alarm means provided to at least one short-range wireless communication node device in the network based on the verified connection state, wherein the activating the alarm means comprises generating a control signal indicating an abnormal connection state between the channel member nodes when a node not connected with any of the other channel member nodes is present among the channel member nodes as a result of the analyzing the connection state table.

15. The method of claim 14, wherein the generating of the channel setting information further comprises generating a proximity profile indicating a request for acknowledging that a short-range wireless communication node device is connected to another node device, and the proximity profile is set to reflect size information of a transportation unit to which the short-range wireless communication node device is attached.

16. The method of claim 15, wherein the generating of the channel setting information further comprises receiving the size information of the transportation unit from a warehouse management system.

17. The method of claim 14, wherein the generating of the channel setting information further comprises generating identifiers of short-range wireless communication node devices that are included in each channel for a plurality of channels, and each channel is allocated for each transportation means on which a transportation unit to which the short-range wireless communication node device is attached.

18. The method of claim 17, wherein the generating of the channel setting information further comprises receiving, from a transportation management system, information about a transportation quantity to be transported through each transportation means.

19. The method of claim 14, further comprising:

transmitting, by each short-range wireless communication node device, a signal indicating the verified connection state to the gateway;

monitoring, by the gateway, location information of the gateway; and determining whether there is a short-range wireless communication node device having transmitting a signal indicating an abnormal connection state that is present when the gateway detects a change of at least a predetermined level in the location information, and transmitting an alarm signal to the server device in response to the short-range wireless communication node device having transmitted the signal indicating the abnormal connection state is present, wherein the gateway is provided in a transportation means on which a transportation unit to which the short-range wireless communication node device is attached.

* * * * *